United States Patent
Litvak et al.

(10) Patent No.: US 11,619,738 B2
(45) Date of Patent: Apr. 4, 2023

(54) WIRELESS DUAL TECHNOLOGY DISPLACEMENT SENSOR

(71) Applicant: TYCO FIRE & SECURITY GMBH, Neuhausen am Rheinfall (CH)

(72) Inventors: Eli Litvak, Netanya (IL); Boris Zhevelev, Rishon le Zion (IL); Shlomo Gabrilovich, Netanya (IL)

(73) Assignee: Tyco Fire & Security GMBH, Neuhauseen am Rheinfall (CH)

( * ) Notice: Subject to any disclaimer, the term of this patent is extended or adjusted under 35 U.S.C. 154(b) by 403 days.

(21) Appl. No.: 16/611,777

(22) PCT Filed: Feb. 26, 2018

(86) PCT No.: PCT/IB2018/051199
§ 371 (c)(1),
(2) Date: Nov. 7, 2019

(87) PCT Pub. No.: WO2018/207030
PCT Pub. Date: Nov. 15, 2018

(65) Prior Publication Data
US 2020/0241135 A1 Jul. 30, 2020

Related U.S. Application Data

(60) Provisional application No. 62/503,567, filed on May 9, 2017.

(51) Int. Cl.
*G08B 13/08* (2006.01)
*G08B 29/18* (2006.01)
(Continued)

(52) U.S. Cl.
CPC .............. *G01S 17/04* (2020.01); *G08B 13/08* (2013.01); *G08B 29/18* (2013.01); *G08C 23/04* (2013.01)

(58) Field of Classification Search
CPC ......... G01S 17/04; G08B 13/08; G08B 29/18; G08B 29/181; G08C 23/04
See application file for complete search history.

(56) References Cited

U.S. PATENT DOCUMENTS 4,507,654 A * 3/1985 Stolarczyk ............. G08B 13/08
340/556
5,912,619 A 6/1999 Vogt
(Continued)

FOREIGN PATENT DOCUMENTS

JP H10176462 A 6/1998
JP 2005009931 A 1/2005
(Continued)

OTHER PUBLICATIONS

Internation Search Report issued in International Appliation No. PCT/IB2018/051199 dated Jul. 31, 2018.
(Continued)

*Primary Examiner* — Adnan Aziz
(74) *Attorney, Agent, or Firm* — ArentFox Schiff LLP (57) ABSTRACT

A wireless dual technology displacement sensor ("displacement sensor system") and method are disclosed. The displacement sensor system includes an analyzing sensor for determining a range to a measuring point and a trigger sensor for activating the analyzing sensor. The trigger sensor is an accelerometer or an optical proximity sensor (OPS), in examples. The analyzing sensor is preferably a time of flight range sensor. When installed as part of a door system having a door and door frame, for example, the trigger sensor detects movement of the door, and activates the analyzing sensor in response. The analyzing sensor then determines the range to the measuring point, such as the door frame. This
(Continued)

two sensor system can be thus used to prevent the high current consumption of existing displacement sensor systems.

17 Claims, 6 Drawing Sheets

(51) Int. Cl.
  *G08C 23/04* (2006.01)
  *G01S 17/04* (2020.01)

(56) References Cited

U.S. PATENT DOCUMENTS

| | | | | |
|---|---|---|---|---|
| 5,936,522 | A * | 8/1999 | Vogt | G08B 13/08 |
| | | | | 340/556 |
| 7,486,386 | B1 * | 2/2009 | Holcombe | G01S 17/04 |
| | | | | 356/5.1 |
| 8,848,202 | B2 * | 9/2014 | Dyer | G01S 7/481 |
| | | | | 356/9 |
| 9,063,574 | B1 * | 6/2015 | Ivanchenko | G06F 1/32 |
| 9,982,459 | B2 * | 5/2018 | Telljohann | E05B 41/00 |
| 2009/0014624 | A1 | 1/2009 | Blees et al. | |
| 2010/0128259 | A1 * | 5/2010 | Bridges | G01S 17/66 |
| | | | | 356/138 |
| 2010/0254711 | A1 * | 10/2010 | Miller | H04B 10/6932 |
| | | | | 398/136 |
| 2012/0292492 | A1 | 11/2012 | De Coi et al. | |
| 2014/0320286 | A1 * | 10/2014 | Thibault | G08B 13/08 |
| | | | | 340/545.1 |
| 2015/0194040 | A1 * | 7/2015 | Fiedler | H04W 4/70 |
| | | | | 340/870.09 |
| 2015/0206415 | A1 | 7/2015 | Wegelin et al. | |
| 2015/0330140 | A1 * | 11/2015 | Kincaid | E06B 7/28 |
| | | | | 324/207.11 |
| 2015/0378013 | A1 * | 12/2015 | Bikumandla | G01S 7/497 |
| | | | | 250/208.2 |
| 2016/0165323 | A1 | 6/2016 | Hollis | |
| 2016/0187368 | A1 * | 6/2016 | Modi | G08B 29/04 |
| | | | | 702/141 |
| 2016/0189511 | A1 | 6/2016 | Peterson et al. | |
| 2016/0203709 | A1 * | 7/2016 | Alameh | G08C 23/04 |
| | | | | 340/12.1 |
| 2016/0252619 | A1 * | 9/2016 | Markendorf | G01S 17/86 |
| | | | | 356/3.01 |
| 2016/0358430 | A1 * | 12/2016 | Smith | G08B 13/08 |
| 2017/0227386 | A1 * | 8/2017 | Campero | G01D 5/12 |
| 2017/0243456 | A1 * | 8/2017 | Smith | G08B 13/2494 |
| 2017/0356238 | A1 * | 12/2017 | Gitman | G08B 13/08 |
| 2017/0372569 | A1 * | 12/2017 | Lamb | G08B 29/185 |

FOREIGN PATENT DOCUMENTS

| | | |
|---|---|---|
| JP | 2017009203 A | 1/2017 |
| WO | WO-2017102573 A1 * | 6/2017 |

OTHER PUBLICATIONS

Youtube User Pseudonym "Elektronik", "Laser-Entfernungsmesser: Was ist drin und wie funktioniert das?", Jan. 4, 2016, URL: http://www.youtube.com/watch?v=pcw3Ue3cLUo.
European Search Report issued in European Patent Application No. 18710532 dated Feb. 8, 2021.

* cited by examiner

WIRELESS DUAL TECHNOLOGY DISPLACEMENT SENSOR

RELATED APPLICATIONS

This application is a 35 U.S.C. § 371 National Phase of PCT Application No. PCT/IB2018/051199, filed on Feb. 26, 2018, which claims priority to U.S. Provisional Application No. 62/503,567, filed on May 9, 2017. The disclosures of the priority applications are hereby incorporated in their entirety by reference.

BACKGROUND OF THE INVENTION

Magnetic displacement sensor systems are a common subsystem in many intrusion systems, and in security systems more generally. Most often, these magnetic displacement sensor systems are used to detect whether doors or windows are ajar or secured. More generally, however, magnetic displacement sensor systems can be used in other applications that require proximity and/or end position sensing, or moving part position sensing.

In these intrusion/security systems, the magnetic displacement sensor systems are typically monitored by a system control panel via a network. In this way, the control panel can monitor whether doors or windows are ajar or secured, for example.

The magnetic displacement sensor systems have traditionally included magnets and reed switches. In a window, for example, the magnets are usually installed on the moving parts, such as on the window sashes. The reed switches, in turn, are usually installed on stationary parts of the window that are adjacent to the moving parts, such as on/within the window frame. When the magnets are brought into proximity of the reed switches, the contacts of switches are closed and the switches become conductive. The control panels then monitor for changes in the conductivity of the reed switches to determine whether the windows have opened.

Reed switch-based magnetic displacement sensor systems often require maintenance. The reed switches themselves can break. The magnets on the moving parts can also move such that there may be insufficient magnetic field at the switch to close the switch. This can occur when a reed switch is installed at an entry/exit door that receives significant foot traffic, for example. As the door is repeatedly opened and closed, the magnets often move over time, possibly causing the switch to fail even when the door is completely closed. Such movement can also result in intermittent failure. The magnetic field at the switch may be just sufficient to close the switch, but may become insufficient to close the switch if the switch or the door is merely bumped. Attenuation in the magnetic field due to movement of the magnets can thereby result in transient operation of the reed switch.

Another issue associated with reed switch-based magnetic displacement sensor systems is the distance between the reed switch and the magnets, also known as the gap. Security personnel seek to minimize the gap, as a larger gap is a loophole in security and can lead to potential false alarms. While more sensitive reed switches can be used to minimize the gap, these more sensitive devices are more costly, and magnetic displacement sensor systems using the more sensitive reed switches also require stronger magnets, which increases the size and cost of the magnets. The larger magnets required also have aesthetic concerns for applications such as fine furniture cabinets, jewelry display cases, and use in art museums, in examples. At the same time, installers prefer a larger gap for easier installation.

The gap is also adversely affected by the proximity of ferromagnetic materials to the reed switches and magnets. For example, a reed switch-based magnetic displacement sensor system deployed at a metal door requires spacers made of electrically insulating material (e.g. plastic) to "lift" the magnets and reed switches away from the metal door and door frame surfaces, which makes installation harder. Because a would-be thief could in theory remove the spacer from the door without security personnel detecting a tampering event upon the reed switch itself, the spacer must be outfitted with a back tamper. This can be a challenge for mechanical design and increase the product cost.

Yet another issue associated with reed switch-based magnetic displacement sensor systems is the presence of magnetic fields. Strong magnetic fields not only adversely affect operation of these systems, but could also be used to defeat them. In some magnetic displacement sensor systems, a strong permanent magnet placed and held near a reed switch in a door frame could cause the reed switch to maintain its normal "door closed" state, allowing an intruder to open the door without triggering an alarm, in one example.

SUMMARY OF THE INVENTION

Instead of using magnetic displacement sensor systems to detect open doors/windows, a range measuring sensor could be used. Such devices consume relative large amounts of power, however.

Aspects of the present invention leverage the understanding that many range measuring sensors consume too much power. This power consumption makes these range measuring sensors inappropriate for use in displacement sensor systems and especially battery operated ones, for example. In such systems, battery life should ideally be counted in years.

As a result, a displacement sensor system is proposed that preferably incorporates two sensors. A first of the sensors functions as a trigger. This trigger sensor wakes the displacement sensor system from a low power mode so that a second sensor can be activated to detect range. This dual sensor system can be thus used to prevent the continuous high current consumption of existing magnetometer-based displacement sensor systems, in one example.

In one example, the first sensor is a trigger sensor that is used to detect real door or asset movement or other possible causes, which is realized by an optical proximity sensor (OPS) or accelerometer, in examples. An OPS typically emits an electromagnetic field or a beam of electromagnetic radiation (e.g. infrared) towards a target surface. In one example, the beam is a pulsed signal. The beam impinges on the target surface and is reflected back to the OPS, and changes in the waveform of the reflected beam are measured to determine proximity to the target surface. In one example, an amplitude of the reflected beam is measured and compared to a reference value.

In the proposed displacement sensor system, the OPS trigger sensor is used to detect movement/determine an indication of movement of a door relative to a door frame, for example. Upon detecting movement/determining an indication of movement, the trigger sensor activates the second sensor.

The second sensor is an analyzing sensor that is used to then measure range. In one example, the analyzing sensor is a VL6180X sold by STMicroelectronics. This sensor measures absolute distance independent of target reflectance by measuring the time that light transmitted by the sensor takes to travel to the nearest object and reflect back to the sensor (Time-of-Flight). The VL6180X includes an infrared (IR) emitter, a range sensor, and an ambient light sensor.

The proposed displacement sensor system also overcomes the issues associated with gap, proximity to ferromagnetic materials, and exposure to magnetic fields of reed switch-based magnetic displacement sensor systems. The displacement sensor system does not use magnets nor relies on magnetic fields for operation, so issues associated with gap and proximity to ferromagnetic materials are eliminated. As a result, no spacers during installation of the proposed displacement sensor system are required, saving on mechanical design, installation time and cost. The optical proximity sensor (OPS) and the range analyzing sensor are also not affected by magnetic fields. This is because the sensors use beams of light (e.g. LED laser light, infrared light) which are not affected by magnetic fields. Because the proposed displacement sensor system uses beams of light to determine motion and range, the displacement sensor system is also a wireless displacement sensor system.

Based on its range measuring analyzing sensor, which measures the range to a moving object (asset, door frame and/or door), the proposed displacement sensor system determines a state (e.g. open or closed) of an asset or door. The displacement sensor system determines the state according to thresholds that are learned by the displacement sensor system during a learning procedure. The learning procedure is executed upon initial startup and/or reset of the system and can be periodically executed over time to recalibrate the system to compensate for some small mechanical changes.

The range measuring analyzing sensor is preferably located on a printed circuit board (PCB) and is oriented to a reference surface, such as a door frame, for example. An IR light emitting diode (LED) of the analyzing sensor emits light to the door frame or other surface and the analyzing sensor will measure the distance between itself and the door frame/other surface. This distance should be within some range that was learned after power up and/or as part of a periodic calibration of the range. For example, if the measured distance has increased beyond an allowed range, that will indicate that the door is open. However, if the distance is within range of the value associated with the initial position of the door or calibrated position of the door, that will indicate that the door is again closed.

Any attempt to block this analyzing sensor by any masking object can be detected and reported. A masking object such as paper placed in the light path of the analyzing sensor, for example, will reduce the range detected by the analyzing sensor, as compared to the value associated with the initial or calibrated position. Thus, defeating attempts can be identified and reported to a control panel and then to a central station, in examples.

Theoretically, it can be possible to fool the analyzing sensor and/or the trigger sensor by replicating the exact distance or range calculated by the analyzing sensor or by replicating the reflection pattern received by the trigger sensor. As a result, in one embodiment, both the trigger sensor and the analyzing sensor are monitored to detect possible spoofing of sensors and related attempts to defeat the system.

The preferred range measuring analyzing sensor is a VL6180X of ST Microelectronics or other similar short range sensor. Such a sensor allows absolute distance to be measured independent of target reflectance, rejects the visible light and provides optical cross talk compensation for cover glass. The analyzing sensor should be able to measure range starting from at least 1 centimeter (cm).

In general, according to one aspect, the invention features a displacement sensor system. The system comprises an analyzing sensor for determining a range to a measuring point and a trigger sensor for activating the analyzing sensor.

Preferably, the analyzing sensor is angled relative to the plane of a surface to which the sensor system is mounted. In one example, the analyzing sensor is angled between 25 and 100 degrees relative to the plane of the surface to which the sensor system is mounted.

Typically, the analyzing sensor is a time of flight range sensor, and the trigger sensor is an optical proximity sensor. Alternatively, the trigger sensor can be an accelerometer.

The sensor system is typically installed upon an object that is adjacent to the measuring point, and the trigger sensor activates the analyzing sensor in response to detecting movement relative to the measuring point.

In one example, the sensor system includes a housing that contains the analyzing sensor and the trigger sensor. The housing also contains a battery that provides a source of input power for the sensor system.

In another example, the sensor system is installed in a door system, specifically installed on the door as a battery powered system.

In general, according to another aspect, the invention features a method of operation for a displacement sensor system. The method includes an analyzing sensor determining a range to a measuring point, and a trigger sensor activating the analyzing sensor.

Additionally and/or alternatively, the trigger sensor activates the analyzing sensor in response to the trigger sensor transmitting light upon the measuring point, determining a DC signal average of reflected light from the measuring point, the reflected light being received in response to the transmitted light, and determining that the DC signal average has exceeded either a lower alarm threshold value or a higher alarm threshold value maintained by the sensor system.

The above and other features of the invention including various novel details of construction and combinations of parts, and other advantages, will now be more particularly described with reference to the accompanying drawings and pointed out in the claims. It will be understood that the particular method and device embodying the invention are shown by way of illustration and not as a limitation of the invention. The principles and features of this invention may be employed in various and numerous embodiments without departing from the scope of the invention.

BRIEF DESCRIPTION OF THE DRAWINGS

In the accompanying drawings, reference characters refer to the same parts throughout the different views. The drawings are not necessarily to scale; emphasis has instead been placed upon illustrating the principles of the invention. Of the drawings.

DETAILED DESCRIPTION OF THE PREFERRED EMBODIMENTS

The invention now will be described more fully hereinafter with reference to the accompanying drawings, in which illustrative embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art.

As used herein, the term "and/or" includes any and all combinations of one or more of the associated listed items. Further, the singular forms and the articles "a", "an" and "the" are intended to include the plural forms as well, unless expressly stated otherwise. It will be further understood that the terms: includes, comprises, including and/or comprising, when used in this specification, specify the presence of stated features, integers, steps, operations, elements, and/or components, but do not preclude the presence or addition of one or more other features, integers, steps, operations, elements, components, and/or groups thereof. Further, it will be understood that when an element, including component or subsystem, is referred to and/or shown as being connected or coupled to another element, it can be directly connected or coupled to the other element or intervening elements may be present.

As explained above, the present displacement sensor system combines an analyzing sensor, which can have a high power consumption, with a trigger sensor that is low in power/current consumption. The analyzing sensor is normally in a low power or "sleep" mode, but might also be completely turned off if the sensor's wake-up time is optimized such that the sensor does not miss any door open/door close events. In one example, the trigger sensor is simply a movement detecting sensor. It could be almost any existing solution to detect movement. In one implementation, the trigger sensor is an optical proximity sensor comprising an IR emitter and photodiode that will detect movement upon sensing a change to a portion of reflected light. The main function of this trigger sensor is to provide a signal to trigger a range measuring analyzing sensor from sleep or to turn its power on. However, the trigger sensor also can be used for other functionality, such as measuring reflection amplitude to help with spoofing prevention.

The analyzing sensor is a range measurement sensor that is suitable for a wide variety of applications. The analyzing sensor measures range as required by various displacement door systems and windows utilized in many different intrusion systems and security systems. Specifically, the minimum range of the analyzing sensor is about 5 millimeters (mm), and the maximum range is about 75 mm. In contrast, the range of some currently available range sensors is more limited, which correspondingly limits the applicability of current range sensors.

Preferably, the trigger sensor is an optical proximity sensor (OPS), but other technologies could be used. For example, an accelerometer could be used. These accelerometers do have disadvantages, however. Installation of an accelerometer is less convenient due to the need to install it on the moving door/window only. Further, an accelerometer may not detect slow door/window movement.

On the other hand, using an optical proximity sensor as the trigger sensor may potentially lead to a problem with dirt build up. This problem, however, can be addressed with periodic thresholds calibration, to avoid false alarms or more frequent wakeup due to the dirt, in one example.

Optical proximity sensors sometimes encounter problems when deployed such that they need to determine range to very dark surfaces. This is because light that is incident upon darker colored surfaces is absorbed more (and therefore reflected less) than surfaces having lighter colored surfaces. In some instances, the current provided to the LED(s) of the sensor can be increased to overcome this problem, but at the expense of battery life. In other instances, such as when the surface is nearly or completely black, the sensor does not receive enough reflected light to operate properly.

Therefore, a preferred solution for resolving issues associated with deployment of optical proximity sensors on dark surfaces is to apply a white sticker to a portion of the surface upon which light from the sensor impinges. The white sticker is fastened/applied to the target (e.g. door frame) at a location enabling maximum reflectance. It can also be appreciated that other materials having a high light reflectance value can also be used, such as white plastic affixed by screws to the door frame, or high reflectance paint applied to the door frame, in examples.

The range measuring analyzing sensor, in one example, measures the range (e.g. distance) from its installation point on a window or door to an adjacent window or door frame member. When the distance between the analyzing sensor and the window or door frame member increases above a certain threshold, this will indicate the window or door is open.

In order to avoid the need for an additional reflective plate, in the preferred embodiment, the PCB carrying the analyzing sensor is mounted at an angle of 75 degrees (or other angle typically between 25 degrees and 100 degrees) with respect to a base of the displacement sensor system so that the other side (e.g. door frame or window frame) will play the role of reflector. In the case where the other side is glass, a special sticker can be used to ensure reflectance.

In other cases, the angle is not needed. A recessed contact can be installed inside the door (installer drills a hole) and the other side/measuring point (e.g. door frame) directly faces the recessed contact. Then, the analyzing sensor is set up point without any displacement angle at the measuring point.

Another use case for the displacement sensor system is at a garage overhead door. Two installation options are preferred. In each, the displacement sensor system is installed by mounting the system at a bottom portion of the door. In a first option, the sensor system is mounted such that an optical axis of its analyzing sensor "looks"/points towards the ground. In a second option, the sensor system is mounted such that the optical axis of its analyzing sensor points to a side of the door, such as towards the door frame (or door).

Installing the displacement sensor system at portions of the garage door other than its bottom portion is not recommended. Installation at a top portion of the door is problematic, in one example, when the optical axis of the sensor system's analyzing sensor points towards the ground. This is because both the time of flight analyzing sensor and the OPS trigger sensor are intended for short range and typically operate at a distance of about 2 meters (m) or less. As a result, such an installation might increase the distance between the sensor and the floor/ground to a point where the sensor system cannot operate normally. Here, while longer range versions of the flight analyzing sensor and the OPS trigger sensor could be used in theory, these sensors usually are blind in short range measurements (which is the main application of the proposed sensor system) and also consume more power.

In another example, if the sensor system were mounted in the side of the door frame/rails of the overhead garage door, then the sensor system would detect open door/closed door events only when the moving portion (e.g. the overhead garage door) reaches the height where the sensor system is installed.

Figure 1:
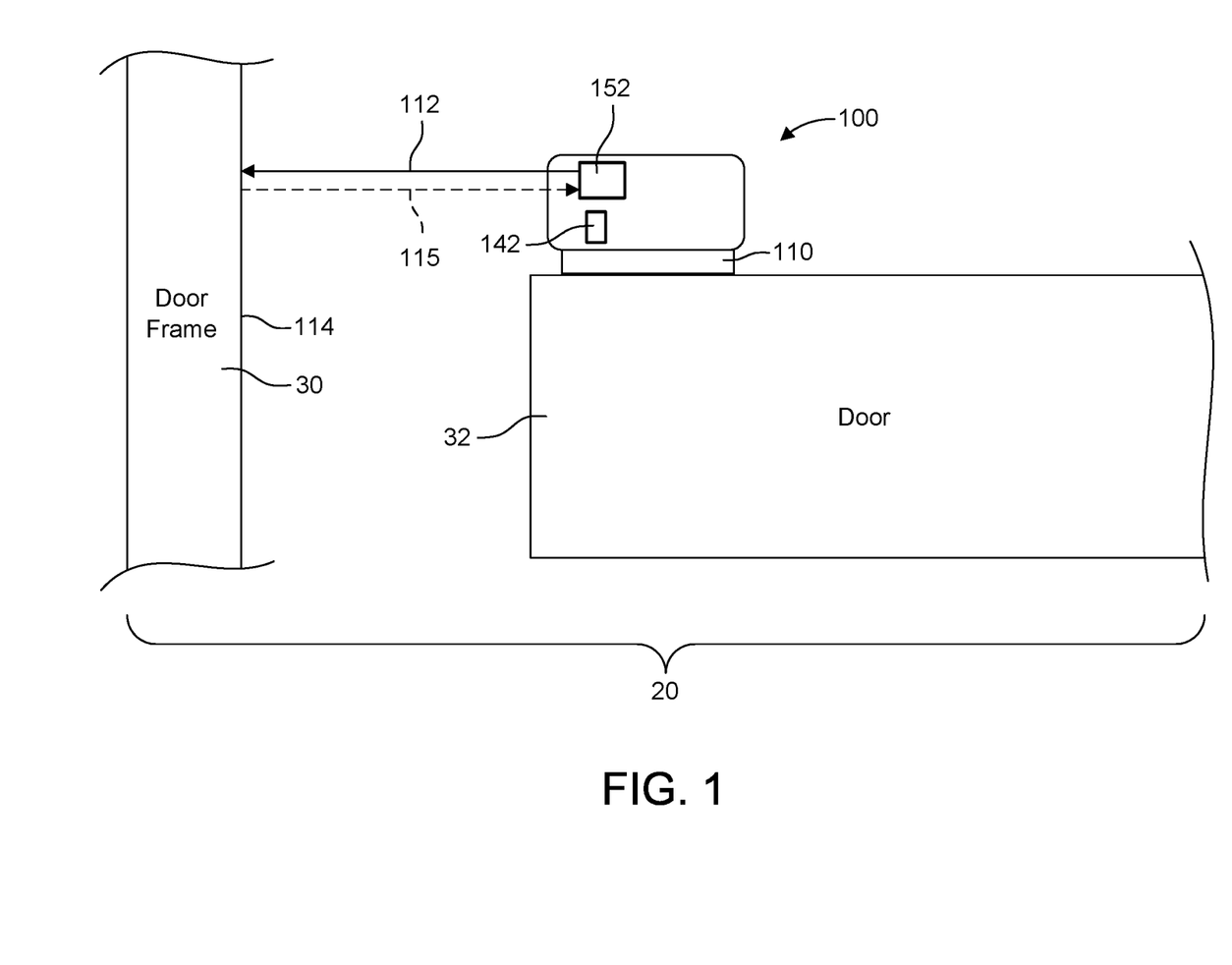
FIG. 1 is a top plan view showing the displacement sensor system mounted to a door of a door system, via a mounting bracket of the displacement sensor system.

Turning now to the disclosed embodiments, FIG. 1 shows the displacement sensor system 100 with its mounting bracket 110. The displacement sensor system 100 also includes a trigger sensor 142 and an analyzing sensor 152. The analyzing sensor 152 determines a range to a measuring point 114, and the trigger sensor 142 activates the analyzing sensor 152.

In the illustrated example, the displacement sensor system 100 is installed at a door system 20 that includes a door frame 30 and door 32, viewed from the top of the door system 20. Via the mounting bracket 110, the displacement sensor system 100 is mounted to door 32, and the measuring point 114 is a reflective surface of the door frame 30.

The analyzing sensor 152 transmits infrared light along its optical axis 112 to determine the range to the measurement point 114. The transmitted light reflects off the measurement point 114 (here, door frame 30) as reflected infrared light 115. The reflected infrared light 115 from the measurement point 114 is then received by the sensor system 100 and detected by its analyzing sensor 152.

In one example, the mounting bracket 110 is on a door 32, window or window frame. Then, the measurement point 114 is a frame member that is adjacent to the mounting bracket 110. In another example, the mounting bracket 110 is on a frame member such as door frame 30 and then the measurement point 114 is part of the door 32, window or window frame.

In more detail, with reference to the illustrated example, the mounting bracket 110 is mounted to the moving portion of the door system 20 (the door 32). And the mounting bracket 110 carries the displacement sensor system 100. The measurement point 114 is a frame member or fixed portion of the door system 20 (here, door frame 30) that is adjacent to the mounting bracket 110. Alternatively, the mounting bracket 110 and displacement sensor system 100 could be mounted on the frame member/door frame 30, and the measurement point 114 is the door 32/a surface of the door 32.

When the trigger sensor 142 is an OPS, the trigger sensor 142 must learn/determine an initial amplitude of the reflected IR light between the trigger sensor 142 and other side (e.g. door frame 30) when the door 32 is closed. The amplitude of the reflected light depends upon both the distance between the trigger sensor 142 and door frame 30, and the reflection screen material and/or color of the surface of the door frame 30. For example, a door frame 30 having a white surface (or other material applied/affixed to the door frame 30 having a high light reflectance value) provides a higher amplitude of the reflected IR light than a door frame 30 with a darker surface. Alternatively, a door frame 30 having a white surface/white sticker enables a deployed trigger sensor 142 to operate over a longer distance between door 32 and door frame 30 than a similarly situated and deployed trigger sensor 142 that transmits its light upon a much darker surface of the door frame 30.

This learning process can be accomplished in several ways. In one example, an installer selects a push button of the displacement sensor system 100. In another example, the displacement sensor system 100 receives a control signal sent by a control panel. In yet another example, the trigger sensor 142 executes this automatically.

The displacement sensor system 100 also includes a method of automatic learning of the desired closed state and trigger sensor 142 hardware configurations, such as current through an LED of the OPS-based trigger sensor 142, and receiver gain, in examples.

The optimal configuration of an OPS as the trigger sensor 152 is usually defined by a few parameters, mainly by the current that flows through an IR light emitting diode (LED) of the OPS. Other parameters include a receiver gain and LED Pulse Width, in examples.

The analyzing sensor 152 determines the range and amplitude of the reflected light 115 while the door 32 is closed. For this purpose, the displacement sensor system 100 will have a predefined threshold of range, for example 5 cm. The analyzing sensor 152 will then periodically measure the range and check if it falls in the predefined range. A measured range value that falls within the predefined range typically means that the door 32 is/remains closed.

It is also required to obtain a stable range during some time frame, such as 1-5 seconds. In this case, the displacement sensor system 100 will learn the real range, which will be the new threshold of the steady state/Door Closed State. If stable range values are not obtained during this time frame, the displacement sensor system 100 will reset and the process is repeated from the beginning.

To calibrate an optical proximity trigger sensor 142 according to the optimal setting that works for the system steady state, a learning procedure of the trigger sensor 142 is executed. The learning procedure will start setting the optical proximity trigger sensor 142 with parameters having the least power consumption, to emit IR and to check if the measurement is inside of some threshold. The procedure is executed in a loop, changing the trigger sensor 142 settings with each pass, until the best settings are found.

A calibration process for the analyzing sensor 152 and the trigger sensor 142 starts with the minimum gain and LED current settings. Then, the next proximity parameters of the trigger sensor 142 are loaded into the proximity sensor registers. Data samples of time-of-flight are obtained by the analyzing sensor 152 and averaged, then compared to a "door open" threshold. If the average time-of-flight range value is greater than the door open threshold, the system returns and the gain in current is reset to the minimum gain. If the average time-of-flight range value is not greater than the door open threshold, the calibration process for the analyzing sensor 152 is repeated with increasing values for the current gain until the average time-of-flight range value is greater than the door open threshold.

For this calibration process, the trigger sensor provides a set of predetermined current gain values, in milliamperes (mA), e.g. 5, 11, 22, 100 and 200. For example, if 5 mA is proven as not enough for this installation, then the next predetermined current gain value is applied (here, 11 mA). When the average time-of-flight range value calculated using the next predetermined current gain value is greater than the door open threshold, the proximity sensor registers are loaded with the new gain value, and the pulse width remains constant.

It should be further appreciated that the disclosed displacement sensor system 100 can be used for other applications beyond determining the state of doors and windows. For example, it can protect: assets including art objects such as pictures and sculptures, and garage overhead doors.

Figure 2:
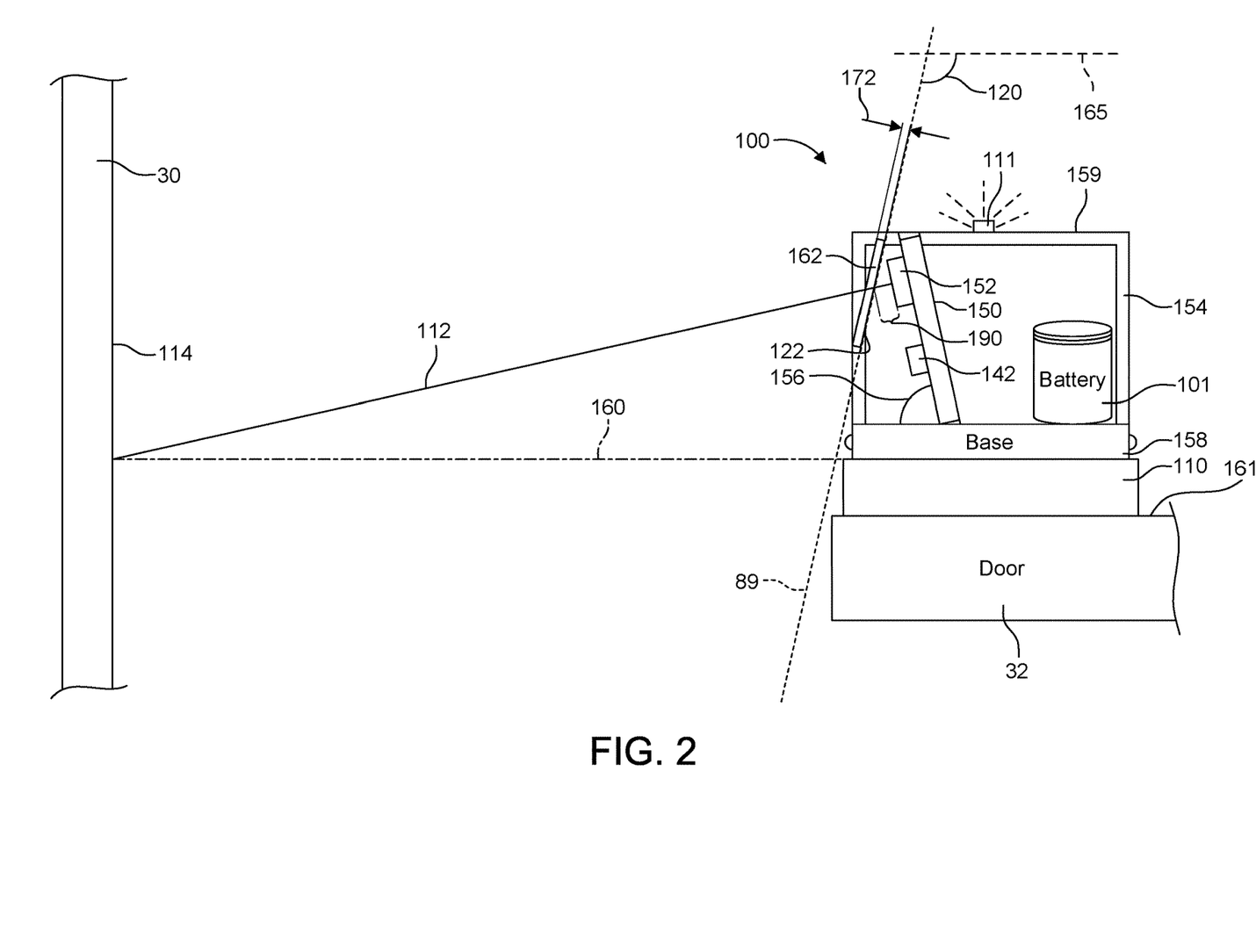
FIG. 2 is a cross sectional view of the displacement sensor system in FIG. 1.

FIG. 2 shows one implementation of the displacement sensor system 100. Here, a cross-section of the displacement sensor system 100 in FIG. 1 shows multiple components that were hidden from view in FIG. 1.

The sensor system 100 has a sensor housing 154 with a base 158. The sensor housing 154 has a hollow interior and is generally cubic in shape. The base 158, in turn, is fastened to mounting bracket 110. A plane 160 of the base 158 extends parallel to a top surface 161 of door 32. A proximal face 159 of the housing 154 is also shown.

Various components are contained by the sensor housing 154. The sensor housing 154 contains a printed circuit board (PCB 150), which in turn holds the analyzing sensor 152 (such as a VL6180X) and the trigger sensor 142, and a microcontroller. The analyzing sensor 152 emits light along an optical axis 112 towards a measurement point 114 such as door frame 30. The PCB and thus the analyzing sensor 152 are angled relative to the plane 160 of the base 158 such that the optical axis 112 of the analyzing sensor 152 points at the door frame 30 at an oblique angle toward the door 32. This angle is indicated by reference 156.

The analyzing sensor 152 can also be described as being angled relative to a plane of the surface (here, top surface 161 of door 32) to which the sensor system 100 is mounted. This is because the plane 160 of the base 158 and the plane extending from the top surface 161 of door 32 are parallel. The angle 156 is between 25 degrees and 100 degrees, preferably about 75 degrees.

The sensor housing 154 also contains a battery 101. The battery 101 provides a source of power to the sensor system 100. In examples, the battery 101 might be Nickel-Cadmium (Nicad), Lithium-ion, Nickel Metal Hydride (NiMH), lead acid, or a supercapacitor.

A system state LED 111 is attached to the proximal face 159 of the housing 154. The system state LED 111 signals various states of the system 100 to installers, using different colors and/or flashing patterns of light, in examples. In one example, the system state LED 111 flashes yellow when the battery 101 is nearly discharged and should be replaced.

A protective window 162 is also provided in a sidewall of the housing 154. The protective window protects the analyzing sensor 152 and trigger sensor 142 from dirt and dust. The window 162 is made from a transparent material such as glass. The window 162 has a thickness 172 of about 0.50 millimeters (mm). A window offset distance 190 between a lens of the analyzing sensor 152 and the inside surface 122 of the window 162 is typically 1 millimeter (1 mm). Typically, the window 162 is at an oblique angle 120 with respect to the proximal face 159 of the housing 154. As shown, angle 120 is measured from plane 165, which is parallel to the proximal face 159, to plane 89 of the protective window 162. The protective window 162 is at angle 120 with respect to the proximal face 159 and the PCB 150 to eliminate/minimize stray light from reflecting off inside surface 122 of the window 120 and then entering the analyzing sensor 152.

In another implementation, the analyzing sensor 152 compensates for optical crosstalk contributed by the protective window 162. For this purpose, the window offset distance 190 is typically selected in accordance with specification details of the analyzing sensor 152.

The trigger sensor 142, such as an optical proximity sensor with external IR LED, is used as a trigger to activate the analyzing sensor 152. In one implementation, the trigger sensor 142 is located on the same PCB 150 as the analyzing sensor 152. In another implementation, the trigger sensor 142 is located on a different circuit board/mounted separately within the sensor housing 154. The OPS as the trigger sensor 142 transmits light to the measuring point 114, and looks for changes in the waveform of the light reflected back from the measuring point 114 to infer movement of the door 32.

Figure 3:
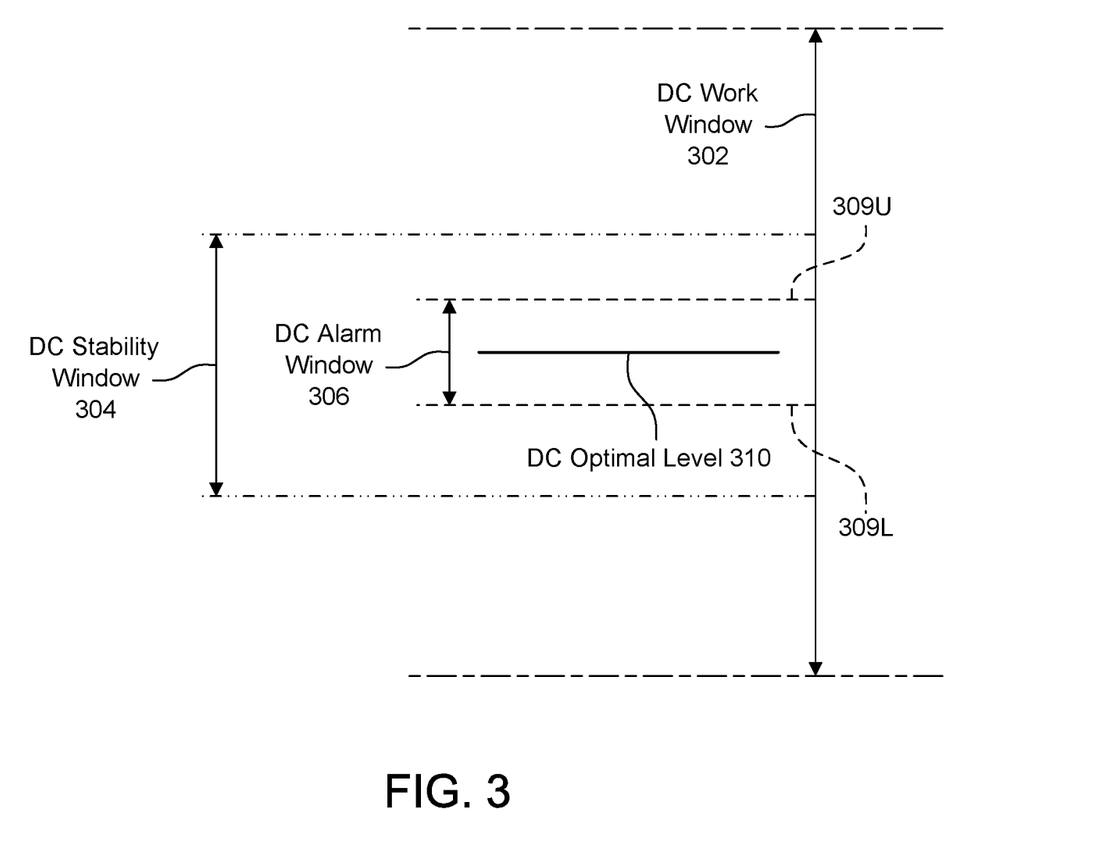
FIG. 3 is a schematic diagram showing the relationship between a DC Work Window, a DC Stability window, and a DC Alarm Window used by a calibration process of the sensor system for calibrating the trigger sensor, when the trigger sensor is an OPS.

FIG. 3 shows various DC signal windows that the sensor system 100 uses to periodically monitor and adjust operation of the trigger sensor 142, when the sensor is an OPS.

When the trigger sensor 142 is an OPS, the trigger sensor 142 typically sends a pulsed signal (e.g. optical, infrared) to the measuring point 114, and monitors changes in the resulting signal waveform reflected back from the measuring point 114. An LED of the OPS sends the pulsed signal. Typically, the sensor system 100 monitors changes in the waveform of the received signal by first calculating a Direct Current (DC) signal average of the waveform, or DC signal average of the trigger sensor 142. In one example, the DC signal average is calculated by sending a number of test pulses (e.g. 10), and computing the average of the amplitudes of the reflected signals received for the test pulses.

Dirt or dust can accumulate upon the trigger sensor 142, which can affect operation of the sensor system 100. The accumulation of dirt on the optic lenses over time may influence the Optical Proximity sensor 142 reading. This, in turn, may impact operation of the sensor system 100 as a whole. This is because the Optical Proximity sensor 142 triggers activation of the analyzing sensor 152, when a change of amplitude in the trigger sensor's DC signal average exceeds some reference or margin.

When the trigger sensor 142 operates improperly, the sensitivity of the trigger sensor 142 can change. To overcome this, the sensor system 100 periodically executes a self-diagnosis procedure to check for amplitude margin of the DC signal average with respect to changes after installation, due to accumulation of dirt or maybe other environmental changes.

With respect to FIG. 3, the microcontroller of the sensor system 100 periodically measures the DC signal average of the trigger sensor 142 and compares the DC signal average to three limiting windows maintained by the sensor system 100. The three limiting windows are: a DC work window 302, a DC stability window 304, and a DC alarm window 306. The limiting windows define different permissible operational ranges for the DC signal average, and therefore are used to control and manage operation of the trigger sensor 142 itself. The microcontroller of the sensor system 100 might also update one or more of the limiting windows when the DC signal average changes (e.g. lessens in amplitude).

The DC work window 302 is a predefined window. It is required to reconfigure the Optical Proximity Sensor (e.g. trigger sensor 142) with a new LED current.

The DC stability window 304 is another predefined window. The DC stability window 304 is included within the DC work window 302. At initial startup of the sensor system 100, it is required that the DC signal average be within range of the DC Stability window 304.

The DC alarm window 306 is a window that is included within the DC Stability window 304. The DC alarm window 306 is a computed/calculated window. The DC alarm window 306 has a lower alarm threshold 309L, a DC optimal level 310, and an upper alarm threshold 309U. Initial values for the upper and lower alarm threshold 309U/309L are typically predefined but could also be configured remotely.

Based on the DC signal average, the trigger sensor 142 either remains in steady-state or triggers activation of the analyzing sensor 152. When the DC signal average is determined to be within range of the upper and lower alarm threshold 309U/309L, the trigger sensor 142 remains in steady-state. In steady-state, the door 32 is closed, and the trigger sensor 142 does not activate the analyzing sensor 152. A DC signal average that crosses (i.e. exceeds) either the upper or lower alarm threshold 309U/309L, however, will cause the trigger sensor 142 to activate (e.g. wake up) the range analyzing sensor 152.

The DC signal average is identified at initial installation by installers, and then monitored and possibly adjusted automatically over time by the running sensor system 100 itself. During initial installation, installers verify that the DC signal average is nearly equal to the DC optimal level 310 when the door 32 is closed. In a preferred embodiment, the DC signal average is also periodically measured and the DC alarm window 306 may be updated in response. For example, when the DC signal average is determined to have decreased over time, such as due to accumulated dirt/dust, the microcontroller of the sensor system 100 adjusts the DC optimal level 310 in response. Here, the DC optimal level 310 would be adjusted to be nearly equal to the new value of the DC signal average. Then, the upper and lower alarm threshold 309U/309L would also correspondingly be adjusted such that the new DC optimal level 310 is centered between the upper and lower alarm threshold 309U/309L by the microcontroller.

Other adjustment scenarios of the limiting windows are possible. In one example, if the microcontroller in response to the trigger sensor 142 determines that the DC signal average is within range of the DC stability window 304, but outside of the DC alarm window 306, the microcontroller of the sensor system 100 might simply adjust the DC alarm window 306. At the same time, if the DC signal average is not within range of the DC stability window 304 (or the DC work window 302), further reconfiguration of the optical proximity sensor is required. In one example, the microcontroller of the sensor system 100 might increase the current applied to the LED(s) of the trigger sensor 142, and then recalculate the DC optimal level 310 and upper and lower alarm threshold 309U/309L accordingly. In this way, the microcontroller of the sensor system 100 is able to adjust for component degradation of and/or dirt upon the trigger sensor 142.

During installation, such as in a door system 20, the microcontroller of the sensor system 100 uses an auto-adjusting method. The purpose of the method is to learn almost without any human intervention the following parameters, which are installation dependent: an initial range value between 2 sides, such as between door frame 30 and door 32 when the door is closed; and the optimal configuration parameters of the trigger sensor 142 (in the case of using an optical proximity sensor as the trigger sensor 142). These optimal configuration parameters include the amount of current supplied to the LED of the trigger sensor 142. A low value for the LED current is desired in order to save power consumption and hence battery 101 life.

The remaining parameters are derived from the initial range value and the OPS LED current. These remaining parameters include, for example, a hysteresis value calculated between the range value of what is to be considered "Door open" and the range value for when the door is closed.

The microcontroller of the sensor system 100 can also signal the installer of an improper installation. For this purpose, the installer will be alerted by a flashing indication of the system state LED 111 if the sensor system 100 has not passed its adjustment procedure and thus is not ready for usage. Until the adjustment procedure has successfully passed, the trigger sensor 142 will report a trouble state to panel, or Door open, in case of "door/window" application.

A typical installation of the sensor system 100 at a door system 20 is as follows. The installer inserts a battery 101 within the housing 104 and mounts the sensor system 100 on the door 32. The system state LED 111 flashes, and the installer closes the door 32 within the door frame 30 and waits for a period of time for the automatic adjustment procedure to complete. If the adjustment successfully completes, the sensor system 100 indicates to the installer via the system state LED 111 that everything is okay and the device is ready for usage. On the other hand, if the procedure has failed, the installer will need to repeat the adjustment procedure.

After the successful adjustment, the installer will need to test whether the installation is proper. This is done as follows. The installer opens the door 32, and verifies that the system state LED 111 indicates a "door open" state. The installer then closes the door 32, and verifies that the system state LED 111 indicates a "door closed" state.

In another example for how the sensor system 100 can signal the installer of an improper installation, assume the following improper installation. A sensor device 100 is mounted on the door 32, far from the end of the door 32 that is adjacent to the measurement point 114. As a result, the OPS LED transmits light to the door 32 itself, instead of to the door frame 30. When opening and closing the door 32 to test whether the installation was proper, the "door open" state will not be indicated by the system state LED 111, so the installer will know the installation was not correct.

Figure 4:
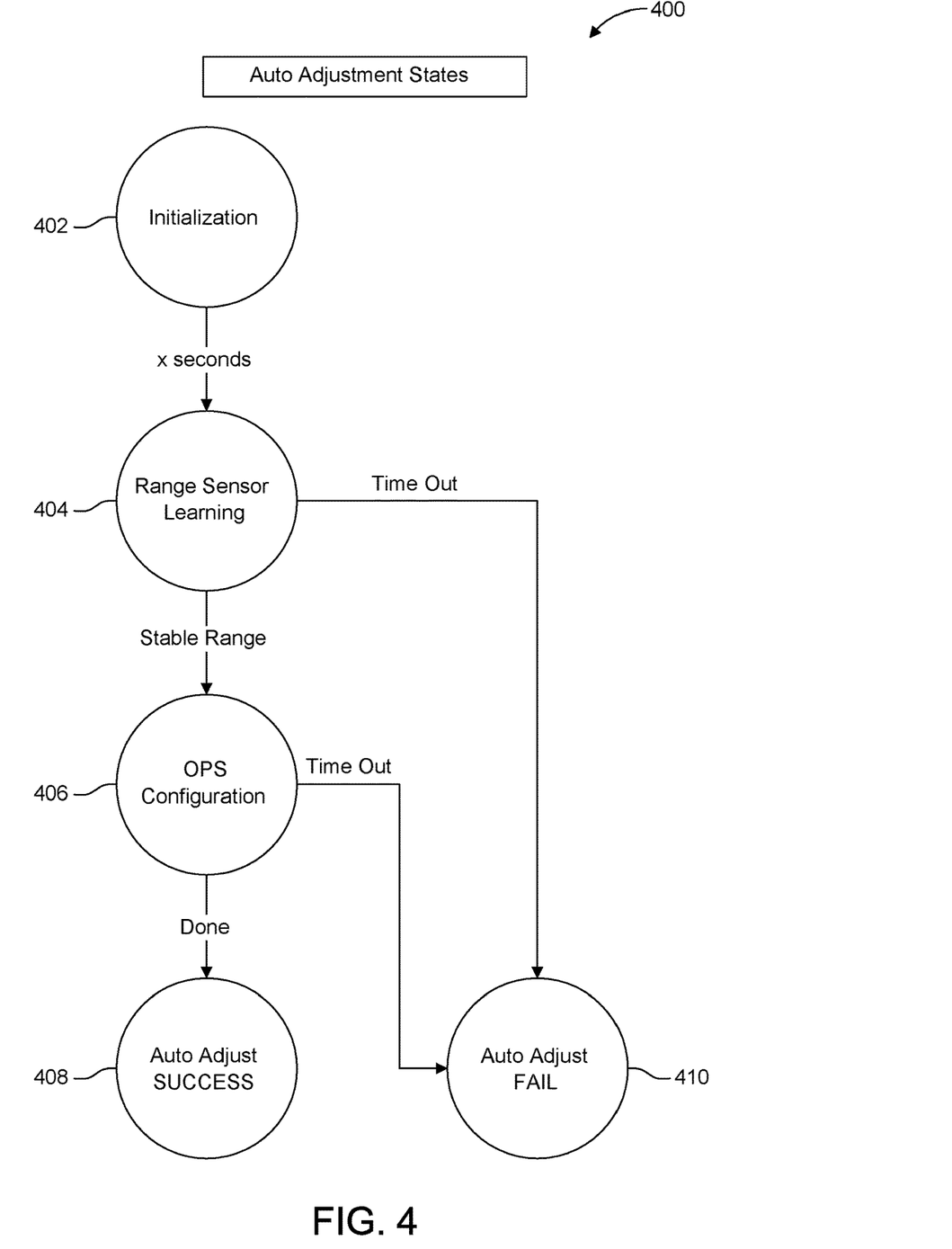
FIG. 4 is a state diagram for the displacement sensor system.

FIG. 4 is a state diagram 400 for the sensor system 100, when the trigger sensor 142 is an OPS. Auto adjustment states in the state diagram 400 are as follows:

| Detector State | Description |
| --- | --- |
| Initialization (402) | Trigger sensor 142 is not ranging, waiting some time to allow installer to insert battery and let the door be in the stable state. Once the trigger sensor 142 is determined to be ranging, after a delay of a few seconds, the system 100 transitions to the range sensor learning 404 state. |
| Range Sensor Learning (404) | Ranging with range analyzing sensor 152 and finding the minimum stable range (a series of X samples). If a stable range is determined, the system 100 transitions to the OPS configuration 406 state. If no stable range is determined after a timeout interval, the system 100 transitions to the Auto adjust FAIL state 410. |
| OPS Configuration (406) | Finding the optimal optical proximity sensor (OPS) configuration, while Range sensor is off |
| Auto-adjust SUCCESS (408) | Normal State |
| Auto-adjust FAIL (410) | Sensor system will behave in a different way letting installer know that Adjustment is not done yet or done improperly (e.g. status LED 111 flashing) |

Figure 5:
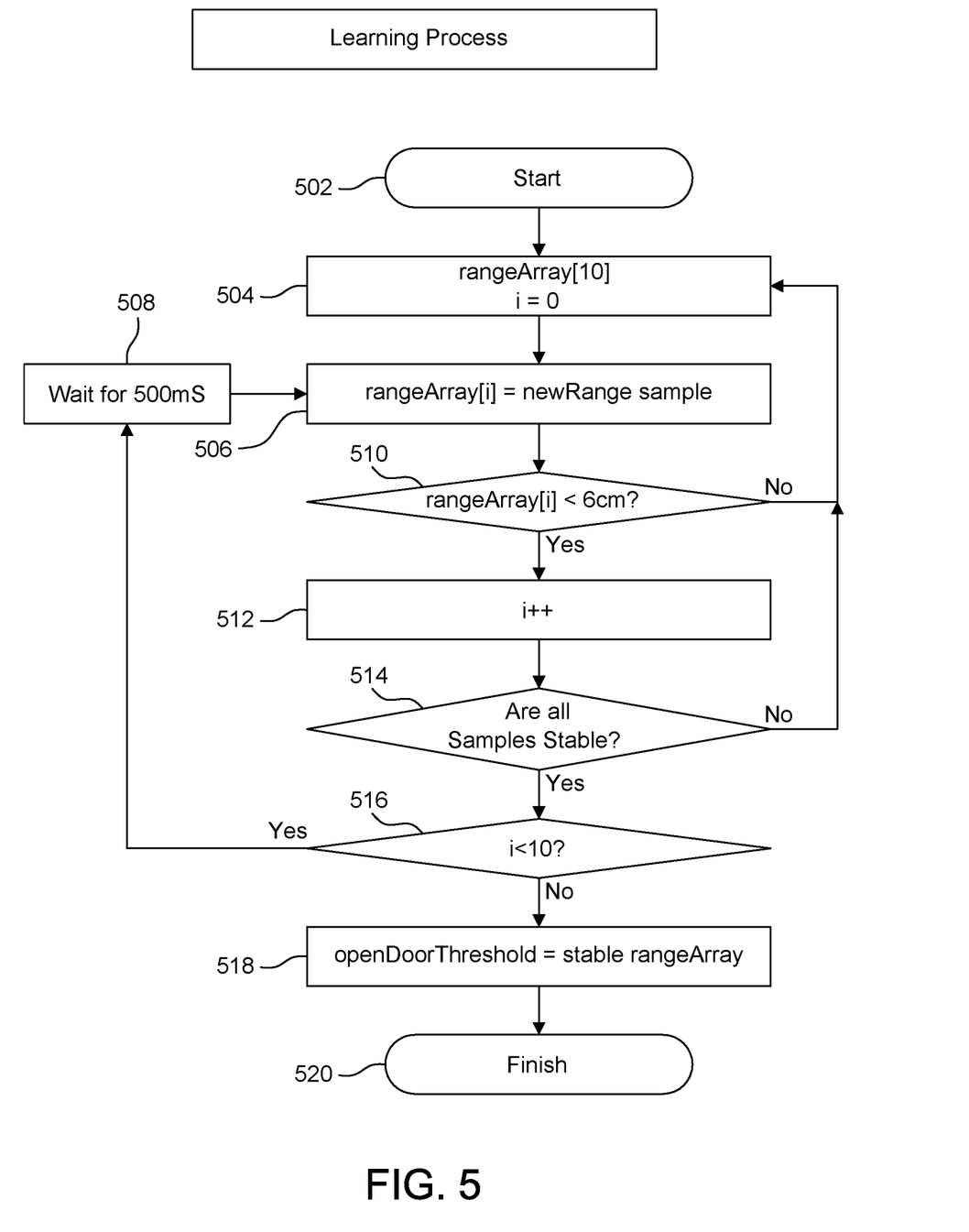
FIG. 5 is a flow diagram showing a range analyzing sensor learning process.

FIG. 5 is a flow diagram showing a learning process performed by the microcontroller for the analyzing sensor 152. Here, it is necessary to learn the range between the door 32 and the door frame 30 (or between a subject and its opposite side in other applications) while the door is closed and stable for some time, such as 5 seconds. The process starts at step 502.

In step 504, range values are sampled every 0.5 seconds until a required number of samples is taken (here, 10 samples). An array is initialized to hold the samples. The array is then populated with the sampled values in step 506.

Then, in steps 510 and 512, the method determines whether each of the sampled values in the array are less than a maximum range value. Here, the maximum range value is 6 centimeters. If the method determines that all samples are less than the maximum range value, the method transitions to step 514. Otherwise, the method transitions back to step 504 to obtain new samples.

In step 514, the sensor system 100 determines whether all samples in the array are stable. Stable samples are samples that are similar to each other, such that a difference between any one sample and another samples in the array of 10 samples is less than some acceptable error $\xi$. This error is a very small but acceptable error in the samples due to mistakes in sample quantization. In one example, the acceptable error $\xi$ is 2 millimeters. Once a sample is determined to differ from the rest of the samples by more than the acceptable error $\xi$ the method transitions back to step 504 to restart the search for 10 stable samples (i=0). Otherwise, the method transitions to step 516.

According to step 516, the method determines whether the required number of samples (here, 10) has been met. If the number of samples is less than 10, the method transitions to step 508, where the system waits for 500 msec, and then transitions to step 506 to obtain more samples. Otherwise, the method transitions to step 518.

In step 518, the method assigns an average of the stable range array values to use as an open door threshold range (e.g. distance) value, and the method ends in step 520.

Figure 6:
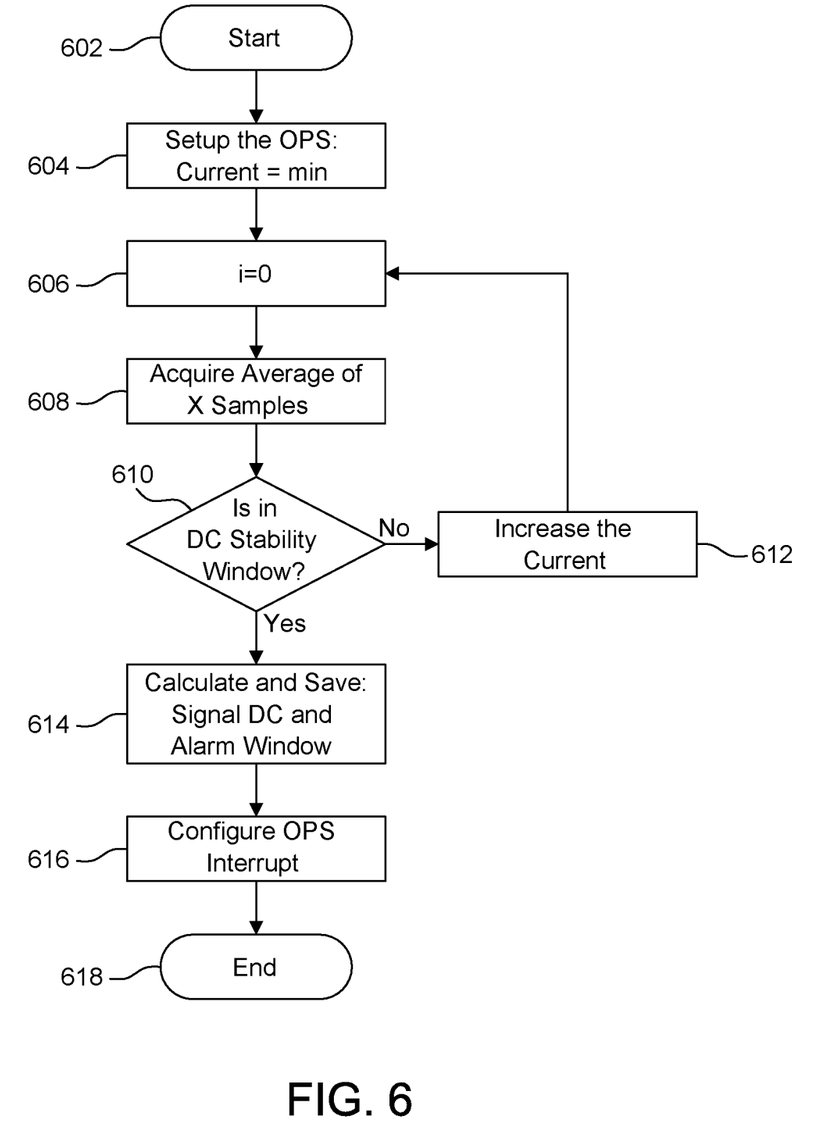
FIG. 6 is a flow diagram showing a method of initial configuration for an optical proximity sensor used as the trigger sensor, according to an embodiment.

FIG. 6 is a flow diagram showing a method for the initial configuration of the optical proximity sensor (OPS), which is used as the trigger sensor 142 in the preferred embodiment. The method performed by the microcontroller optimally configures the optical proximity sensor 142 to achieve the best battery life and to have a configurable wakeup sensitivity for activating the analyzing sensor 152. The method starts in step 602.

In step 604, setup of the OPS trigger sensor 142 is executed. Here, the LED current value, which has the most impact upon battery 101 life, is set to its minimum value. In steps 606 and 608, a number (here, indicated by X) of DC signal average values are obtained and then averaged. In one example, X=10. The DC signal average of the trigger sensor 142 was previously discussed in the description that accompanies FIG. 3, included herein above.

According to step 610, the method determines whether the average of the DC signals calculated in step 608 is within the range of the DC stability window 304. If the average of the DC signal value is within this range, the method transitions to step 614. Otherwise, the method transitions to step 612.

In step 612, the trigger sensor 142 increases its LED current and the method transitions to step 606 to confirm that the DC signal average of the reflected signal received by the trigger sensor 142 is within the range of the DC stability window 304.

In step 616, the method configures OPS interrupt settings. Typically, the OPS interrupt settings are defined to generate an interrupt (i.e. activate the analyzing sensor 152) when the DC signal average crosses either the upper or lower alarm threshold 309U/309L.

While this invention has been particularly shown and described with references to preferred embodiments thereof, it will be understood by those skilled in the art that various changes in form and details may be made therein without departing from the scope of the invention encompassed by the appended claims.

What is claimed is:

1. A displacement sensor system, comprising:
   an analyzing sensor for determining a range to a measuring point, wherein the displacement sensor system is installed upon an object that is adjacent to the measuring point; and
   a trigger sensor for:
      transmitting light upon the measuring point;
      receiving a reflected light reflected from the measuring point in response to transmitting the light;
      detecting a movement of the object relative to the measuring point based on determining that a DC signal average of the reflected light has exceeded either a lower alarm threshold value or a higher alarm threshold value maintained by the displacement sensor system; and
      activating the analyzing sensor to determine the range in response to the trigger sensor detecting the movement of the object relative to the measuring point.

2. The displacement sensor system as claimed in claim 1, wherein a board carrying the analyzing sensor is angled relative to a plane of a surface to which the displacement sensor system is mounted.

3. The displacement sensor system as claimed in claim 1, wherein a board carrying the analyzing sensor is angled between 25 and 100 degrees relative to a plane of a surface to which the displacement sensor system is mounted.

4. The displacement sensor system as claimed in claim 1, wherein the analyzing sensor is a time of flight range sensor.

5. The displacement sensor system as claimed in claim 1, wherein the trigger sensor is an optical proximity sensor comprising a photodiode configured to detect the reflected light.

6. The displacement sensor system as claimed in claim 1, further comprising:
   a housing that contains the analyzing sensor and the trigger sensor; and
   a battery contained within the housing that provides a source of input power for the displacement sensor system.

7. The displacement sensor system as claimed in claim 1, wherein the displacement sensor system is installed in a door system.

8. The displacement sensor system as claimed in claim 1, wherein the measuring point is a frame member adjacent to a door or a window when the displacement sensor system is mounted on the door or the window, respectively; and
   wherein the measuring point is a part of the door or the window when the displacement sensor system is mounted on a door frame or a window frame, respectively.

9. The displacement sensor system of claim 1, wherein the analyzing sensor is further configured to generate a signal indicative of the range to the measuring point.

10. A method of operation for a displacement sensor system, the method comprising:
    determining, by an analyzing sensor, a range to a measuring point, wherein the displacement sensor system is installed upon an object that is adjacent to the measuring point;
    transmitting, by a trigger sensor, light upon the measuring point;

receiving, by the trigger sensor, a reflected light reflected from the measuring point in response to transmitting the light;

detecting, by the trigger sensor, a movement of the object relative to the measuring point based on determining that a DC signal average of the reflected light has exceeded either a lower alarm threshold value or a higher alarm threshold value maintained by the displacement sensor system; and activating, by the trigger sensor, the analyzing sensor to determine the range in response to the trigger sensor detecting the movement of the object relative to the measuring point.

11. The method of claim 10, wherein a board carrying the analyzing sensor is angled relative to a plane of a surface to which the displacement sensor system is mounted.

12. The method of claim 10, wherein a board carrying the analyzing sensor is angled between 25 and 100 degrees relative to a plane of a surface to which the displacement sensor system is mounted.

13. The method of claim 10, wherein the analyzing sensor comprises a time of flight range sensor.

14. The method of claim 10, wherein the trigger sensor comprises an optical proximity sensor comprising a photodiode configured to detect the reflected light.

15. The method of claim 10, further comprising powering the displacement sensor system using a battery.

16. The method as claimed in claim 10, wherein the measuring point is a frame member adjacent to a door or a window when the displacement sensor system is mounted on the door or the window, respectively; and wherein the measuring point is a part of the door or the window when the displacement sensor system is mounted on a door frame or a window frame, respectively.

17. The method of claim 10, further comprising generating, by the analyzing sensor, a signal indicative of the range to the measuring point.

* * * * *